United States Patent
Marsico (10) Patent No.: US 8,812,020 B2
(45) Date of Patent: Aug. 19, 2014

(54) METHODS, SYSTEMS, AND COMPUTER READABLE MEDIA FOR LOCATION-BASED POLICY ENHANCEMENT

(75) Inventor: Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/251,784

(22) Filed: Oct. 3, 2011

(65) Prior Publication Data
US 2012/0094685 A1    Apr. 19, 2012

Related U.S. Application Data

(60) Provisional application No. 61/393,851, filed on Oct. 15, 2010, provisional application No. 61/405,139, filed on Oct. 20, 2010.

(51) Int. Cl.
*H04W 24/00* (2009.01)
*H04M 11/00* (2006.01)
*H04W 4/00* (2009.01)

(52) U.S. Cl.
USPC ......... 455/456.1; 455/405; 455/406; 370/328

(58) Field of Classification Search
USPC .................. 455/456.1, 406, 405; 370/328
See application file for complete search history.

(56) References Cited

U.S. PATENT DOCUMENTS

| | | | |
|---|---|---|---|
| 6,144,636 | A | 11/2000 | Aimoto et al. |
| 7,072,651 | B2 | 7/2006 | Jiang et al. |
| 8,305,922 | B2 | 11/2012 | Cuervo |
| 8,331,229 | B1 | 12/2012 | Hu et al. |
| 8,626,156 | B2 | 1/2014 | Marsico |
| 2003/0003928 | A1 | 1/2003 | Marjelund et al. |
| 2004/0116117 | A1 | 6/2004 | Ahvonen et al. |
| 2005/0107091 | A1 | 5/2005 | Vannithamby et al. |

(Continued)

FOREIGN PATENT DOCUMENTS

| EP | 0 857 399 B1 | 5/2004 |
|---|---|---|
| EP | 1 988 680 A1 | 11/2008 |

(Continued)

OTHER PUBLICATIONS

Communication of European Publication Number and Information on the Application of Article 67(3) EPC for European Patent Application No. 10841576.1 (Oct. 10, 2012).

(Continued)

*Primary Examiner* — Omoniyi Obayanju
(74) *Attorney, Agent, or Firm* — Jenkins, Wilson, Taylor & Hunt, P.A.

(57) ABSTRACT

According to one aspect, the subject matter described herein includes a method for location-based policy enhancement. The method includes receiving a message containing location information identifying a current geographic location for a user device. The method also includes analyzing the location information to determine if the user device is located in a geographic region associated with a location based policy enhancement offer. The method further includes in response to determining that the user device is located in the geographic region associated with the location-based policy enhancement offer, generating a signaling message containing instructions to modify a policy attribute associated with the user device, wherein the policy attribute corresponds to the location-based policy enhancement offer. The method further includes communicating the signaling message to a policy control function associated with the user device.

27 Claims, 8 Drawing Sheets

(56) References Cited

U.S. PATENT DOCUMENTS

| | | | |
|---|---|---|---|
| 2007/0054665 | A1 | 3/2007 | Elkarat et al. |
| 2007/0195788 | A1 | 8/2007 | Vasamsetti et al. |
| 2008/0043689 | A1* | 2/2008 | Walter .......................... 370/338 |
| 2008/0142599 | A1* | 6/2008 | Benillouche et al. ..... 235/462.41 |
| 2009/0061855 | A1 | 3/2009 | Sethi et al. |
| 2009/0109845 | A1 | 4/2009 | Andreasen et al. |
| 2009/0207730 | A1 | 8/2009 | Stamoulis et al. |
| 2009/0219946 | A1 | 9/2009 | Liu et al. |
| 2009/0225762 | A1* | 9/2009 | Davidson et al. ............. 370/401 |
| 2009/0228956 | A1 | 9/2009 | He et al. |
| 2009/0325574 | A1 | 12/2009 | Izawa et al. |
| 2010/0048161 | A1 | 2/2010 | He et al. |
| 2010/0080171 | A1 | 4/2010 | Rune et al. |
| 2010/0241496 | A1* | 9/2010 | Gupta et al. ................. 705/14.1 |
| 2010/0246500 | A1 | 9/2010 | Rydnell et al. |
| 2010/0287121 | A1 | 11/2010 | Li et al. |
| 2010/0291924 | A1 | 11/2010 | Antrim et al. |
| 2010/0297985 | A1* | 11/2010 | Van Erlach ................ 455/414.1 |
| 2011/0067085 | A1 | 3/2011 | Brouard et al. |
| 2011/0076985 | A1 | 3/2011 | Chami et al. |
| 2011/0103261 | A1 | 5/2011 | Duan |
| 2011/0116382 | A1 | 5/2011 | McCann et al. |
| 2011/0158090 | A1 | 6/2011 | Riley et al. |
| 2011/0165901 | A1 | 7/2011 | Baniel et al. |
| 2011/0188457 | A1 | 8/2011 | Shu et al. |
| 2011/0199903 | A1 | 8/2011 | Cuervo |
| 2011/0217979 | A1 | 9/2011 | Nas |
| 2011/0225306 | A1 | 9/2011 | Delsesto et al. |
| 2011/0307790 | A1 | 12/2011 | Pandya et al. |
| 2011/0317557 | A1 | 12/2011 | Siddam et al. |
| 2012/0014332 | A1 | 1/2012 | Smith et al. |
| 2012/0028626 | A1 | 2/2012 | Marocchi et al. |
| 2012/0039175 | A1* | 2/2012 | Sridhar et al. ................ 370/236 |
| 2012/0052866 | A1 | 3/2012 | Froehlich et al. |
| 2012/0099529 | A1 | 4/2012 | Williams |
| 2012/0099715 | A1 | 4/2012 | Ravishankar et al. |
| 2012/0100849 | A1 | 4/2012 | Marsico |
| 2012/0140632 | A1 | 6/2012 | Norp et al. |
| 2012/0176894 | A1 | 7/2012 | Cai et al. |
| 2012/0257499 | A1 | 10/2012 | Chatterjee et al. |
| 2014/0022897 | A1 | 1/2014 | Rajagopalan et al. |
| 2014/0031029 | A1 | 1/2014 | Rajagopalan et al. |

FOREIGN PATENT DOCUMENTS

| | | | |
|---|---|---|---|
| EP | 2 093 931 A1 | 8/2009 | |
| WO | WO 2009/058067 A1 | 5/2009 | |
| WO | WO 2011/082035 A2 | 7/2011 | |

OTHER PUBLICATIONS

Commonly-assigned, co-pending U.S. Appl. No. 61/671,691 for "Methods and System for Dynamically Controlling Signaling Costs in a Mobile Network," (Unpublished, filed Jul. 14, 2012).

Notification of Transmittal of the International Search Report and the Written Opinion of the International Searching Authority, or the Declaration for International Patent Application No. PCT/US2010/061586 (Sep. 26, 2011).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).

3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).

3GPP, "3rd Generation Partnership Project; Technical Specification Group Core Network and Terminals; Non-Access-Stratum (NAS) Functions Related to Mobile Staton (MS) in Idle Mode (Release 10)," 3GPP TS 23.122 v10.0.0, pp. 1-41 (Jun. 2010).

3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).

3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).

Znaty, "Diameter, GPRS, (LTE + ePC = EPS), IMS, PCC and SDM," EFFORT, pp. 1-229 (Part 1 of 2) (May 2010).

Znaty, "Diameter, GPRS, (LTE + ePC = EPS), IMS, PCC and SDM," EFORT pp. 230-461 (Part 2 of 2) (May 2010).

"Universal Mobile Telecommunications System (UMTS); LTS; Policy and Charging Control over Gx Reference Point (3GPP TS 29.212 version 9.2.0 Release 9)," ETSI TS 129 212 V9.2.0, pp. 1-115 (Apr. 2010).

3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).

3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).

3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

International Standard, "Maritime Navigation and Radiocommunication Equipment and Systems—Digital Interfaces—Part 1: Single Talker and Multiple Listeners," IEC 61662-1, Second edition, pp. 1-86 (Jul. 2000).

Non-Final Office Action for U.S. Appl. No. 12/973,228 (Feb. 1, 2013).

Non-Final Office Action for U.S. Appl. No. 13/040,020 (Jul. 18, 2013).

Final Office Action for U.S. Appl. No. 12/973,228 (Jun. 21, 2013).

Non-Final Office Action for U.S. Appl. No. 13/276,916 (Apr. 11, 2013).

Final Office Action for U.S. Appl. No. 13/040,020 (Dec. 13, 2013).

Notification of Transmittal of the International Search Report and the Written Opinion of the International Searching Authority, or the Declaration for International Application No. PCT/US2013/050512 (Dec. 2, 2013).

Notice of Allowance and Fee(s) Due for U.S. Appl. No. 13/330,086 (Nov. 6, 2013).

Notification of Transmittal of the International Search Report and the Written Opinion of the International Searching Authority, or the Declaration for International Application No. PCT/US2013/051447 (Oct. 28, 2013).

Non-Final Office Action for U.S. Appl. No. 12/973,228 (Oct. 25, 2013).

Notice of Allowance and Fee(s) Due for U.S. Appl. No. 13/276,916 (Sep. 3, 2013).

Commonly-assigned, co-pending International Applicaton No. PCT/US13/51447 for "Methods, Systems and Computer Readable Media for Distributing Policy Rules to the Mobile Edge," (Unpublished, filed Jul. 22, 2013).

(56) References Cited

OTHER PUBLICATIONS

Commonly-assigned, co-pending U.S. Appl. No. 13/947,314 for "Methods, Systems and Computer Readable Media for Distributing Policy Rules to the Mobile Edge," (Unpublished, filed Jul. 22, 2013).

Commonly-assigned, co-pending International Applicaton No. PCT/US13/50512 for "Methods, Systems, and Computer Readable Media for Dynamically Controlling Congestion in a Radio Access Network," (Unpublished, filed Jul. 15, 2013).

Commonly-assigned, co-pending U.S. Appl. No. 13/942,323 for "Methods, Systems, and Computer Readable Media for Dynamically Controlling Congestion in a Radio Access Network," (Unpublished, filed Jul. 15, 2013).

"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).

"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).

\* cited by examiner

FIG. 6B

METHODS, SYSTEMS, AND COMPUTER READABLE MEDIA FOR LOCATION-BASED POLICY ENHANCEMENT

PRIORITY CLAIM

This application claims the benefit of U.S. Provisional Patent Application Ser. No. 61/393,851, filed Oct. 15, 2010 and U.S. Provisional Patent Application Ser. No. 61/405,139, filed Oct. 20, 2010; the disclosures of which are incorporated herein by reference in their entirety.

TECHNICAL FIELD

The subject matter described herein relates to location-based policy enhancement. More specifically, the subject matter relates to methods, systems, and computer readable media for location-based policy enhancement.

BACKGROUND

As telecommunication technology evolves, an increasing number of applications are available to users. Many of these applications (e.g., video on demand) utilize substantial network resources, particularly bandwidth. The utilization of such applications creates an ever increasing demand on the limited resources of telecommunications providers. In an effort to manage such resource demands, telecommunications providers often employ network policies to limit resource utilization. Employing a policy scheme allows a network provider to offer its most demanding users, who may be willing to pay greater service charges, the high quality of service (QoS) required by such resource-hungry applications. Additionally, policy schemes may enable telecommunications providers to incentivize desired behavior on the part of their subscribers.

Modern telecommunication devices often include technology for determining a network device's geographic location. For example, many modern network devices are equipped with global positioning system (GPS) technology. Additionally, telecommunications providers are often able to accurately locate network devices based on their proximity to various network resources. Existing network architectures, however, have failed to fully appreciate the possibility that a network device's policy attributes may be manipulated based on its location. Utilizing such a location-based policy scheme, may enable telecommunications providers to incentivize behavior that benefits providers, users, and third parties alike.

Accordingly, a need exists for methods, systems, and computer readable media for location-based policy enhancement.

SUMMARY

According to one aspect, the subject matter described herein includes a method for location-based policy enhancement. The method includes receiving a message containing location information identifying a current geographic location for a user device. The method also includes analyzing the location information to determine if the user device is located in a geographic region associated with a location based policy enhancement offer. The method further includes in response to determining that the user device is located in the geographic region associated with the location-based policy enhancement offer, generating a signaling message containing instructions to modify a policy attribute associated with the user device, wherein the policy attribute corresponds to the location-based policy enhancement offer. The method further includes communicating the signaling message to a policy control function associated with the user device.

According to another aspect, the subject matter described herein includes a system for location-based policy enhancement. The system includes a communication interface configured to receive a message containing location information identifying a current geographic location for a user device. The system also includes a policy enhancement module. The policy enhancement module is configured to analyze the location information to determine if the user device is located in a geographic region associated with a location-based policy enhancement offer. The policy enhancement module is also configured to, in response to determining that the user device is located in the geographic region associated with the location-based policy enhancement offer, generate a signaling message containing instructions to modify a policy attribute associated with the user device, wherein the policy attribute corresponds to the location-based policy enhancement offer. The policy enhancement module is further configured to communicate the signaling message to a policy control function associated with the user device.

As used herein, the term "node" refers to a physical computing platform including one or more processors and memory.

As used herein, the terms "function" or "module" refer to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
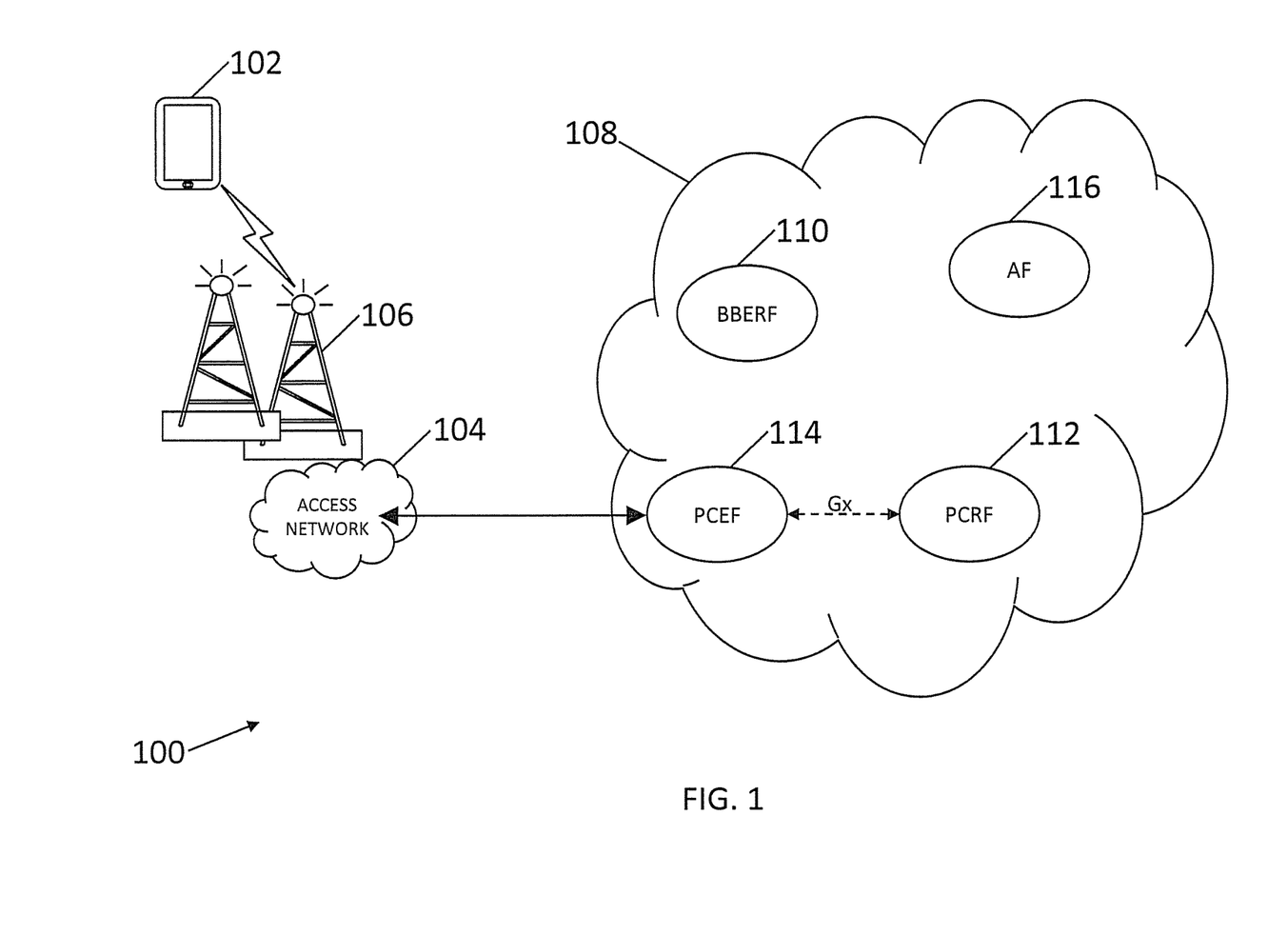
FIG. 1 is a network diagram illustrating an exemplary network environment for location-based policy enhancement according to an embodiment of the subject matter described herein.

Methods, systems, and computer readable media for location-based policy enhancement are provided. FIG. 1 is a network diagram illustrating an exemplary network environment for location-based policy enhancement according to an embodiment of the subject matter described herein. Referring to FIG. 1, network environment 100 may include one or more user equipment (UE) nodes. UE nodes may include any device(s) through which a subscriber may access one or more applications and/or services provided by network environment 100, and may include tablet computers, laptop computers, pagers, mobile phones, smartphones, wireless modems, and other devices through which a subscriber may access applications and/or services provided by network environment 100. For example, network environment 100 may include UE 102. Network environment 100 may include one or more access networks, which may include nodes, functions, devices, and/or components for providing UE 102 access to applications, services, functions, or devices in one or more networks. For example, network environment 100 may include access network 104. In one embodiment, access network 104 may be a radio access network (RAN). For example, access network 104 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IPCAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 104 may include one or more receiver/transceiver nodes for wirelessly communicating with UE 102. For example, access network 104 may include receiver/transceiver nodes 106 for wirelessly communicating with UE 102.

Network environment 100 may include one or more carrier networks. For example, network environment 100 may include carrier network 108. Carrier network 108 may include one or more bearer binding and event reporting function (BBERF) nodes, which may coordinate delivery of data to and from UE(s), and may be, for example, a service gateway (SGW) or a serving general packet radio service (GPRS) support node (SGSN). For example, carrier network 108 may include BBERF node 110, which may coordinate delivery of data to and from UE 102. Carrier network 108 may include one or more policy control function nodes, which may be, for example, resource admission control subsystem (RAGS) nodes and/or policy and charging rules function (PCRF) nodes. PCRF nodes may serve as central policy decision points within network environment 100 and may aid one or more network operator(s) associated with network environment 100 in making real-time, subscriber specific, policy decisions that may be utilized to provide varying levels of QoS. For example, carrier network 108 may include PCRF node 112, which may serve as a central policy decision point within network environment 100 for UE 102.

As a policy decision point for carrier network 108, PCRF node 112 may take operator defined service policies, subscription information pertaining to a user, and other data into account to build policy decisions. Policy decisions may be formulated as policy control and charging (PCC) rules, for example, Gx rules contained in credit control messages. PCC rules may contain information about user plane traffic expressed as a service data flow (SDF) or packet filter. A packet filter may take the form of an Internet protocol (IP) five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet filter of a PCC rule may be designated an SDF.

Flow-based charging models may provide operators associated with network environment 100 with the ability to gate (e.g., allow/block), charge, or vary QoS for SDFs identified by SDF filters according to specified policy control and charging rules. PCC rules may contain information that allows the filtering of traffic to identify packets belonging to a particular SDF (e.g., IP multimedia subsystem (IMS), file transfer protocol (FTP), browsing) and allow an operator to define how a particular SDF is to be charged (e.g., different media streams within a single packet data protocol (PDP) context.) PCC rules may be requested by a policy and charging enforcement function (PCEF) node (e.g., by a packet data network (PDN) gateway in an evolved packet system (EPS)), at bearer establishment, upon a specified trigger event, and/or upon bearer termination. Such a request may be made using a Gx reference point towards a PCRF. PCC rules may specify one or more QoS policy attributes, for example, a guaranteed download bit rate, a minimum download bit rate, a maximum download bit rate, a permitted SDF, a permitted QoS class, a permitted access point name (APN), a permitted destination IP address, and a download quota.

Carrier network 108 may include one or more policy enforcement function nodes, which may be PCEF nodes, and may be placed in line between one or more access networks and one or more PCRF nodes. For example, carrier network 108 may include PCEF node 114, which may be placed in line between access network 104 and PCRF node 112. PCEF node 114 may be, for example, a gateway GPRS support node (GGSN) or PDN gateway. As a policy enforcement point, PCEF node 114 may request and receive policy rules from PCRF node 112 via, for example, the Gx interface.

In accordance with embodiments of the subject matter described herein, carrier network 108 may include a policy enhancement module for location-based policy enhancement. In some embodiments, a policy enhancement module may be included as part of a policy enhancement application function (AF) node. For example, carrier network 108 may include policy enhancement AF node 116 for location-based policy enhancement. In some embodiments, a policy enhancement module may be included as part of one or more policy control function node(s). For example, PCRF node 112 may include a policy enhancement module for location-based policy enhancement. A network node that includes a policy enhancement module (e.g., AF node 116, PCRF node 112) may be configured to receive a message containing location information identifying a current geographic location for a user device, such as UE 102. Such a message may be received from UE 102, a node within access network 104, or a node within carrier network 108, (e.g., a home subscriber server (HSS), a location server, a home location register (HLR), a mobility management entity (MME), BBERF node 110, PCEF node 114, a call session control function (CSCF), a presence server, a network monitoring system, a radio network controller (RNC), a base transceiver station, a NodeB, and/or an eNodeB). For example, ETSI 131 111 V8.3.0 (2008-10) discloses at section 6.4.40 a "Geographical Location Request" command which can be used to request that a user device equipped with a positioning feature report its location information. The location information may take the form of a street address, GPS coordinates, a set of map coordinates, geographical area description (GAD) shapes, and/or national marine electronics association (NMEA) sentences. For example, AF node 116 may receive a message from UE 102 that contains GPS coordinates identifying UE 102's current geographic location.

The policy enhancement module of AF node 116 may be configured to analyze the location information to determine if the user device is located in a geographic region associated with a location-based policy enhancement offer. In analyzing the location information, the policy enhancement module of AF node 116 may utilize the location information (e.g., the GPS coordinates identifying UE 102's current location) to query a location-based policy enhancement table for one or more policy enhancement offers that are associated with UE 102's current location. For example, the GPS coordinates identifying UE 102's current geographic location may correspond to a location-based policy enhancement offer associated with a coffee shop at which UE 102 is currently located. The location-based policy enhancement offer may specify a proximity requirement for the policy enhancement offer and the policy enhancement module of AF node 116 may verify that the received location information places UE 102 within the required proximity. For example, the coffee shop policy enhancement offer may specify a tight proximity requirement, ensuring that UE 102 is located at the coffee shop and not merely near the coffee shop. The policy enhancement offer may further specify a policy attribute for modification and/or a duration for the policy enhancement. For example, the coffee shop policy enhancement offer may specify that the minimum guaranteed download bit rate of a user device should be increased by twenty-five percent for one hour. The policy enhancement module of AF node 116 may be configured to, in response to having determined that a user device is located in a geographic region associated with a location-based policy enhancement offer, generate a signaling message containing instructions to modify the specified policy attribute and communicate the signaling message to a policy control function associated with UE 102. For example, the policy enhancement module of AF node 116 may, in response to having determined that UE 102 is located in the specified coffee shop, generate a signaling message specifying that the minimum guaranteed download bit rate of UE 102 should be increased by twenty-five percent for one hour and may communicate the signaling message to PCRF node 112.

Figure 2:
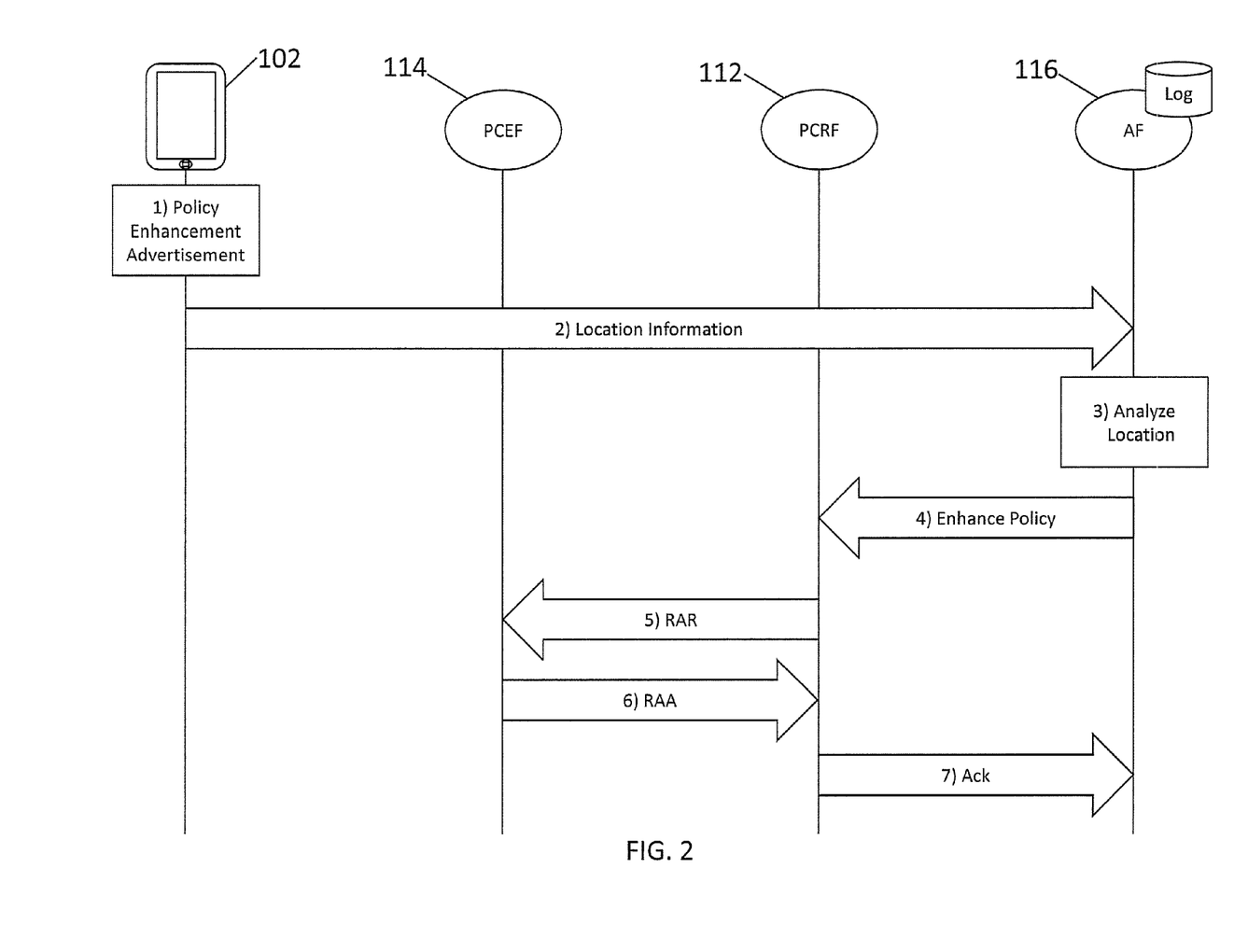
FIG. 2 is a message flow diagram illustrating an exemplary message sequence in which a user encounters a policy enhancement advertisement for location-based policy enhancement according to an embodiment of the subject matter described herein.

FIG. 2 is a message flow diagram illustrating an exemplary message sequence in which a user encounters a policy enhancement advertisement for location-based policy enhancement according to an embodiment of the subject matter described herein. Referring to FIG. 2, at step 1, a user of UE 102 may encounter a policy enhancement advertisement. The policy enhancement advertisement may take the form of a poster or printed publication. For example, a user of UE 102 may encounter a poster which offers an hour long twenty-five percent increase in UE 102's minimum guaranteed download bit rate if UE 102 goes to a coffee shop identified in the poster. In some embodiments, the policy enhancement advertisement may include a policy enhancement code that is associated with the policy enhancement offer. In some embodiments, the policy enhancement advertisement may display a bar or quick response (QR) code that includes the policy enhancement code and UE 102 may be associated with a camera and configured to derive the policy enhancement code from the bar or QR code. In some embodiments, the policy enhancement advertisement may include a smart tag and UE 102 may be associated with a near field communication (NFC) module or radio frequency identification (RFID) reader and obtain the policy enhancement code from the smart tag. In some embodiments, the policy enhancement advertisement may include a beacon which transmits the policy enhancement code via radio frequency, Bluetooth, and/or infrared technology and UE 102 may include a module for obtaining the policy enhancement code from the signal. In some embodiments, the policy enhancement advertisement may specify a location associated with the policy enhancement offer advertised. The location associated with the policy enhancement offer may be specified using a description of a geographic region associated with the policy enhancement offer advertised which may include a street address, a set of GPS coordinates, and/or a set of map coordinates. For example, the policy enhancement advertisement for an hour long twenty-five percent increase in a user device's minimum guaranteed download bit rate may specify a coffee shop associated with the policy enhancement offer and may include a geographic description of the coffee shop, such as its street address.

Having learned of the location-based policy enhancement offer and/or obtained a policy enhancement code associated with the location-based policy enhancement offer, a user of UE 102 may move to the location specified by the policy enhancement advertisement (e.g., the coffee shop identified in the poster). At step 2, AF node 116 may receive a message containing location information identifying the current geographic location for UE 102. For example, AF node 116 may receive a message containing GPS coordinates that correspond to UE 102's current location. At step 3, AF node 116's policy enhancement module may analyze the location information to determine if UE 102 is located in a geographic region associated with a location-based policy enhancement offer. For example, AF node 116's policy enhancement module may analyze the GPS coordinates that correspond with UE 102's current location and determine that UE 102 is located in a geographic region that corresponds to the policy enhancement offer for an hour long twenty-five percent increase in UE 102's minimum guaranteed download bit rate (e.g., the GPS coordinates correspond to the specified coffee shop). In some embodiments, AF node 116 may receive a message containing a policy enhancement code associated with the location-based policy enhancement offer (not illustrated) and AF node 116's policy enhancement module may utilize the received policy enhancement code to identify the location-based policy enhancement offer. For example, AF node 116 may receive a policy enhancement code obtained by UE 102 from the poster offering an hour long twenty-five percent increase in UE 102's minimum guaranteed download bit rate to identify a policy enhancement offer associated with the policy enhancement code (e.g., a policy enhancement offer for an hour long twenty-five percent increase in minimum guaranteed download bit rate for a user device located at the identified coffee shop).

At step 4, AF node 116's policy enhancement module may, in response to having determined that UE 102 is located in a geographic region associated with the policy enhancement offer for the hour long twenty-five percent increase in UE 102's minimum guaranteed download bit rate (e.g., the specified coffee shop), generate a signaling message containing instructions to modify a policy attribute associated with the user device. The policy attribute may correspond to the location-based policy enhancement offer. For example, AF node 116's policy enhancement module may generate a signaling message to increase UE 102's minimum guaranteed download bit rate for an hour. The signaling message may then be communicated to a policy control function associated with UE 102. For example, AF node 116's policy enhancement module may communicate the signaling message to PCRF node 112. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect communication of the signaling message to a policy control function associated with UE 102.

Having received the signaling message from AF node 116's policy enhancement module, PCRF node 112 may generate a PCC rule that modifies the policy attribute (e.g., increases UE 102's minimum guaranteed download bit rate). In some embodiments, the PCC rule may be configured to expire after a predetermined time period. For example, the PCC rule for increasing UE 102's minimum guaranteed download bit rate may be configured to expire after one hour. At step 5, PCRF node 112 may communicate the PCC rule to a policy enforcement function associated with UE 102. For example, PCRF node 112 may communicate the PCC rule for increasing UE 102's minimum guaranteed download bit rate to PCEF node 114. The PCC rule may be communicated, for example, via a re-auth request (RAR) message. PCEF node 114 may then implement the PCC rule for UE 102 (e.g., increase UE 102's minimum guaranteed download bit rate). At step 6, PCEF node 114 may acknowledge receiving the PCC rule by generating and communicating to PCRF node 112 an acknowledgement message, for example, a re-auth answer (RAA) message. At step 7, PCRF node 112 may generate and communicate to AF node 116 an acknowledgment message, which may confirm receipt of the signaling message and/or successful/unsuccessful implementation of the policy attribute modification. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect receipt of the signaling message and/or successful implementation of the policy attribute modification.

Figure 3:
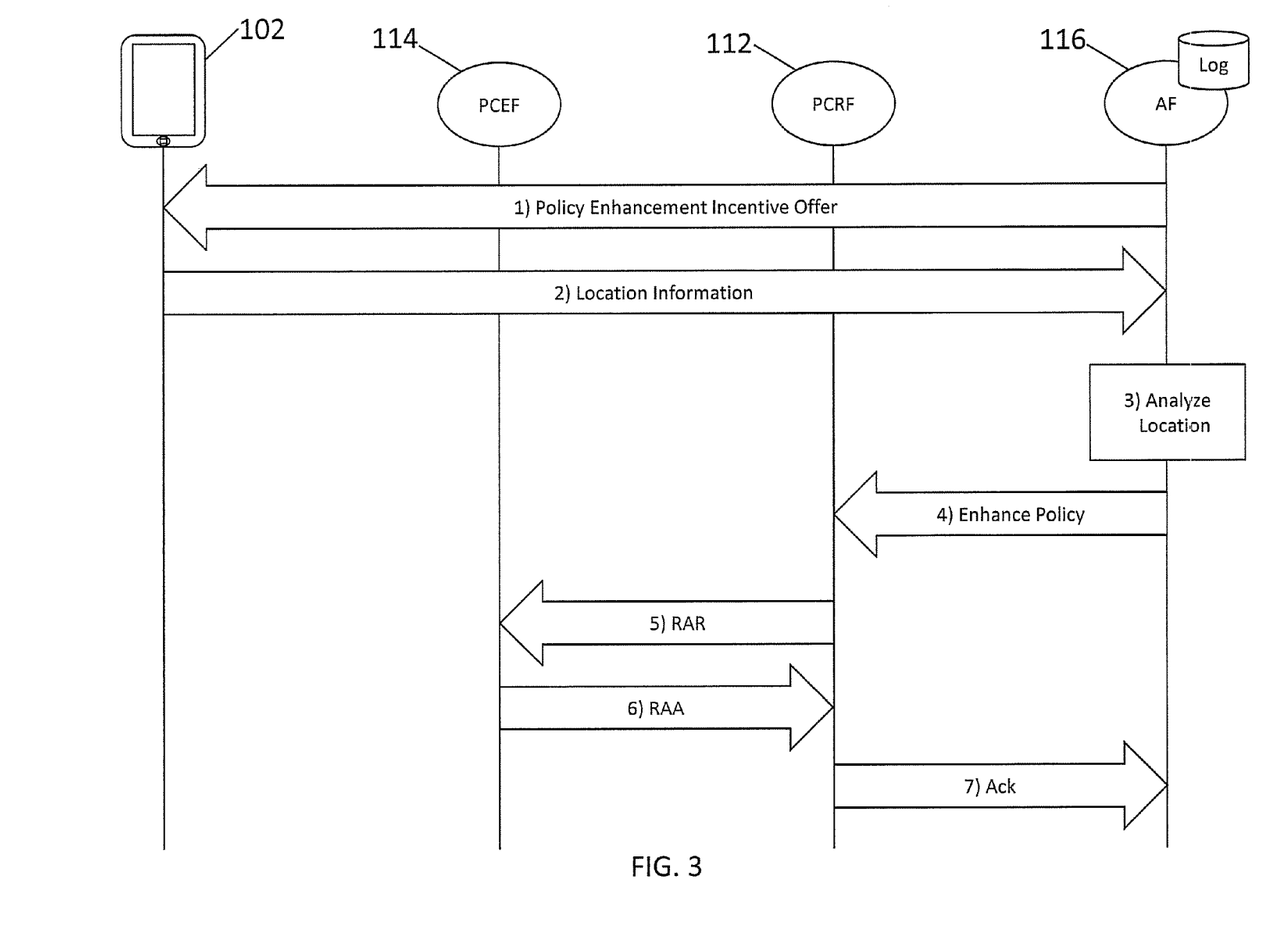
FIG. 3 is a message flow diagram illustrating an exemplary message sequence in which a user is provided with a policy enhancement offer message for location-based policy enhancement according to an embodiment of the subject matter described herein.

FIG. 3 is a message flow diagram illustrating an exemplary message sequence in which a user is provided with a policy enhancement offer message for location-based policy enhancement according to an embodiment of the subject matter described herein. Referring to FIG. 3, at step 1, AF node 116's policy enhancement module may communicate a policy enhancement offer message to UE 102. The policy enhancement offer message may be a short message service (SMS) message, a multimedia messaging service (MMS) message, an instant message, an email message, a social networking service message, a voicemail message, a Diameter message, an extensible markup language (XML) message, a session initiation protocol (SIP) message, and/or a simple object access protocol (SOAP) message. The policy enhancement offer message may inform a user of UE 102 of a location-based policy enhancement offer. For example, the policy enhancement offer message may inform a user of UE 102 of a location-based policy enhancement offer for an hour long twenty-five percent increase in UE 102's minimum guaranteed download bit rate if UE 102 goes to a coffee shop identified by the policy enhancement offer message. In some embodiments, the policy enhancement offer message may include a policy enhancement code that is associated with the policy enhancement offer. In some embodiments, the policy enhancement offer message may specify a location associated with the policy enhancement offer. The location associated with the policy enhancement offer may be specified using a description of a geographic region associated with the policy enhancement offer which may include a street address, a set of GPS coordinates, and/or a set of map coordinates. For example, the policy enhancement offer message for an hour long twenty-five percent increase in UE 102's minimum guaranteed download bit rate may specify a coffee shop associated with the policy enhancement offer and may include a geographic description of the coffee shop, such as its street address.

Having learned of the location-based policy enhancement offer and/or obtained a policy enhancement code associated with the location-based policy enhancement offer, a user of UE 102 may move to the location specified by the policy enhancement offer message (e.g., the coffee shop identified in the policy enhancement offer message). At step 2, AF node 116 may receive a message containing location information identifying the current geographic location for UE 102. For example, AF node 116 may receive a message containing GPS coordinates that correspond to UE 102's current location. At step 3, AF node 116's policy enhancement module may analyze the location information to determine if UE 102 is located in a geographic region associated with a location-based policy enhancement offer. For example, AF node 116's policy enhancement module may analyze the GPS coordinates that correspond with UE 102's current location and determine that UE 102 is located in a geographic region that corresponds to the policy enhancement offer for an hour long twenty-five percent increase in UE 102's minimum guaranteed download bit rate (e.g., the GPS coordinates correspond to the specified coffee shop). In some embodiments, AF node 116 may receive a message containing a policy enhancement code associated with the location-based policy enhancement offer (not illustrated) and AF node 116's policy enhancement module may utilize the received policy enhancement code to identify the location-based policy enhancement offer. For example, AF node 116 may receive a policy enhancement code contained in the policy enhancement offer message previously communicated to UE 102 for the hour long twenty-five percent increase in UE 102's minimum guaranteed download bit rate and may utilize the policy enhancement code to identify a policy enhancement offer associated with the policy enhancement code (e.g., a policy enhancement offer for an hour long twenty-five percent increase in minimum guaranteed download bit rate for a user device located at the identified coffee shop).

At step 4, AF node 116's policy enhancement module may, in response to having determined that UE 102 is located in a geographic region associated with the policy enhancement offer for the hour long twenty-five percent increase in UE 102's minimum guaranteed download bit rate (e.g., the specified coffee shop), generate a signaling message containing instructions to modify a policy attribute associated with the user device. The policy attribute may correspond to the location-based policy enhancement offer. For example, AF node 116's policy enhancement module may generate a signaling message to increase UE 102's minimum guaranteed download bit rate for an hour. The signaling message may then be communicated to a policy control function associated with UE 102. For example, AF node 116's policy enhancement module may communicate the signaling message to PCRF node 112. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect communication of the signaling message to a policy control function associated with UE 102.

Having received the signaling message from AF node 116's policy enhancement module, PCRF node 112 may generate a PCC rule that modifies the policy attribute (e.g., increases UE 102's minimum guaranteed download bit rate). In some embodiments, the PCC rule may be configured to expire after a predetermined time period. For example, the PCC rule for increasing UE 102's minimum guaranteed download bit rate may be configured to expire after one hour. At step 5, PCRF node 112 may communicate the PCC rule to a policy enforcement function associated with UE 102. For example, PCRF node 112 may communicate the PCC rule for increasing UE 102's minimum guaranteed download bit rate to PCEF node 114. The PCC rule may be communicated, for example, via an RAR message. PCEF node 114 may then implement the PCC rule for UE 102 (e.g., increase UE 102's minimum guaranteed download bit rate). At step 6, PCEF node 114 may acknowledge receiving the PCC rule by generating and communicating to PCRF node 112 an acknowledgement message, for example, an RAA message. At step 7, PCRF node 112 may generate and communicate to AF node 116 an acknowledgment message, which may confirm receipt of the signaling message and/or successful/unsuccessful implementation of the policy attribute modification. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect receipt of the signaling message and/or successful implementation of the policy attribute modification.

Figure 4:
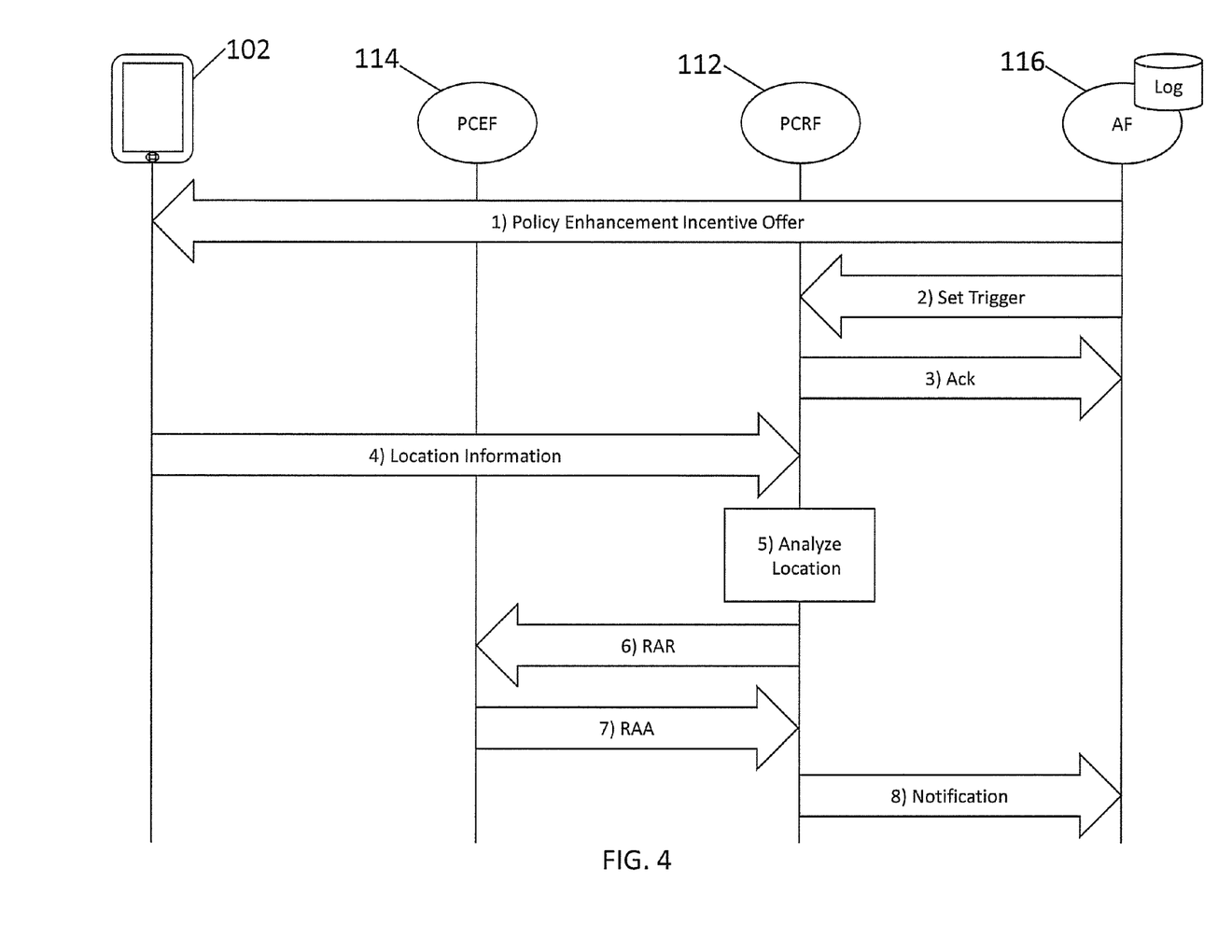
FIG. 4 is a message flow diagram illustrating an exemplary message sequence in which location-based policy enhancement is performed by a policy control function node for location-based policy enhancement according to an embodiment of the subject matter described herein.

FIG. 4 is a message flow diagram illustrating an exemplary message sequence in which location-based policy enhancement is performed by a policy control function node for location-based policy enhancement according to an embodiment of the subject matter described herein. Referring to FIG. 4, at step 1, AF node 116's policy enhancement module may communicate a policy enhancement offer message to UE 102. The policy enhancement offer message may be an SMS message, an MMS message, an instant message, an email message, a social networking service message, a voicemail message, a Diameter message, an XML message, a SIP message, and/or a SOAP message. The policy enhancement offer message may inform a user of UE 102 of a location-based policy enhancement offer. For example, the policy enhancement offer message may inform a user of UE 102 of a location-based policy enhancement offer for an hour long twenty-five percent increase in UE 102's minimum guaranteed download bit rate if UE 102 goes to a coffee shop identified by the policy enhancement offer message. In some embodiments, the policy enhancement offer message may include a policy enhancement code that is associated with the policy enhancement offer. In some embodiments, the policy enhancement offer message may specify a location associated with the policy enhancement offer. The location associated with the policy enhancement offer may be specified using a description of a geographic region associated with the policy enhancement offer which may include a street address, a set of GPS coordinates, and/or a set of map coordinates. For example, the policy enhancement offer message for an hour long twenty-five percent increase in UE 102's minimum guaranteed download bit rate may specify a coffee shop associated with the policy enhancement offer and may include a geographic description of the coffee shop, such as its street address. At step 2, AF node 116's policy enhancement module may send a trigger message to a policy control function associated with UE 102. For example, AF node 116's policy enhancement module may send a trigger message to PCRF node 112. The trigger message may include instructions for informing a policy enhancement module associated with the policy control function that a location-based policy enhancement offer has been communicated to UE 102 and that the policy control function associated with UE 102 should analyze location information received from UE 102 to determine if UE 102 is located in a geographic region associated with the location-based policy enhancement offer. For example, the trigger message sent from AF node 116's policy enhancement module to PCRF node 112 may include instructions informing PCRF node 112's policy enhancement module that the policy enhancement offer message for an hour long twenty-five percent increase in minimum guaranteed download bit rate has been communicated to UE 102 and that PCRF node 112's policy enhancement module should analyze location information received from UE 102 to determine if UE 102 is located in a geographic region associated with the location-based policy enhancement offer (e.g., the specified coffee shop). At step 3, PCRF node 112 may acknowledge having received AF node 116's trigger message. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect communication of the trigger message to a policy control function associated with UE 102.

Having learned of the location-based policy enhancement offer and/or obtained a policy enhancement code associated with the location-based policy enhancement offer, a user of UE 102 may move to the location specified by the policy enhancement offer message (e.g., the coffee shop identified in the policy enhancement offer message). At step 4, PCRF node 112 may receive a message containing location information identifying the current geographic location for UE 102. For example, PCRF node 112 may receive a message containing GPS coordinates that correspond to UE 102's current location. At step 5, PCRF node 112's policy enhancement module may analyze the location information to determine if UE 102 is located in a geographic region associated with a location-based policy enhancement offer. For example, PCRF node 112's policy enhancement module may analyze the GPS coordinates that correspond with UE 102's current location and determine that UE 102 is located in a geographic region that corresponds to the policy enhancement offer for an hour long twenty-five percent increase in UE 102's minimum guaranteed download bit rate (e.g., the GPS coordinates correspond to the specified coffee shop). Prior to step 6, PCRF node 112's policy enhancement module may, in response to having determined that UE 102 is located in a geographic region associated with the policy enhancement offer for the hour long twenty-five percent increase in UE 102's minimum guaranteed download bit rate (e.g., the specified coffee shop), generate a signaling message containing instructions to modify a policy attribute associated with the user device. The policy attribute may correspond to the location-based policy enhancement offer. For example, PCRF node 112's policy enhancement module may generate a signaling message to increase UE 102's minimum guaranteed download bit rate for an hour. The signaling message may then be communicated to a policy control function associated with UE 102. For example, PCRF node 112's policy enhancement module may communicate the signaling message to PCRF node 112's policy control function (not illustrated). In some embodiments, PCRF node 112's policy enhancement module may update a log entry associated with the policy enhancement offer (not illustrated). For example, PCRF node 112's policy enhancement module may update a log entry associated with the policy enhancement offer for an hour long twenty-five percent increase in a user device's minimum guaranteed download bit rate to reflect communication of the signaling message to a policy control function associated with UE 102.

Having received the signaling message from PCRF node 112's policy enhancement module, PCRF node 112's policy control function may generate a PCC rule that modifies the policy attribute (e.g., increases UE 102's minimum guaranteed download bit rate). In some embodiments, the PCC rule may be configured to expire after a predetermined time period. For example, the PCC rule for increasing UE 102's minimum guaranteed download bit rate may be configured to expire after one hour. At step 6, PCRF node 112 may communicate the PCC rule to a policy enforcement function associated with UE 102. For example, PCRF node 112 may communicate the PCC rule for increasing UE 102's minimum guaranteed download bit rate to PCEF node 114. The PCC rule may be communicated, for example, via an RAR message. PCEF node 114 may then implement the PCC rule for UE 102 (e.g., increase UE 102's minimum guaranteed download bit rate). At step 7, PCEF node 114 may acknowledge receiving the PCC rule by generating and communicating to PCRF node 112 an acknowledgement message, for example, an RAA message. At step 8, PCRF node 112 may generate and communicate to AF node 116 a notification message, which may inform AF node 116's policy enhancement module of successful/unsuccessful implementation of the policy attribute modification. In some embodiments, AF node 116's policy enhancement module may update a log entry associated with the policy enhancement offer (not illustrated). For example, AF node 116's policy enhancement module may update a log entry associated with the policy enhancement offer for an hour long twenty-five percent increase in a user device's minimum guaranteed download bit rate to reflect successful implementation of the policy attribute modification for UE 102.

Figure 5:
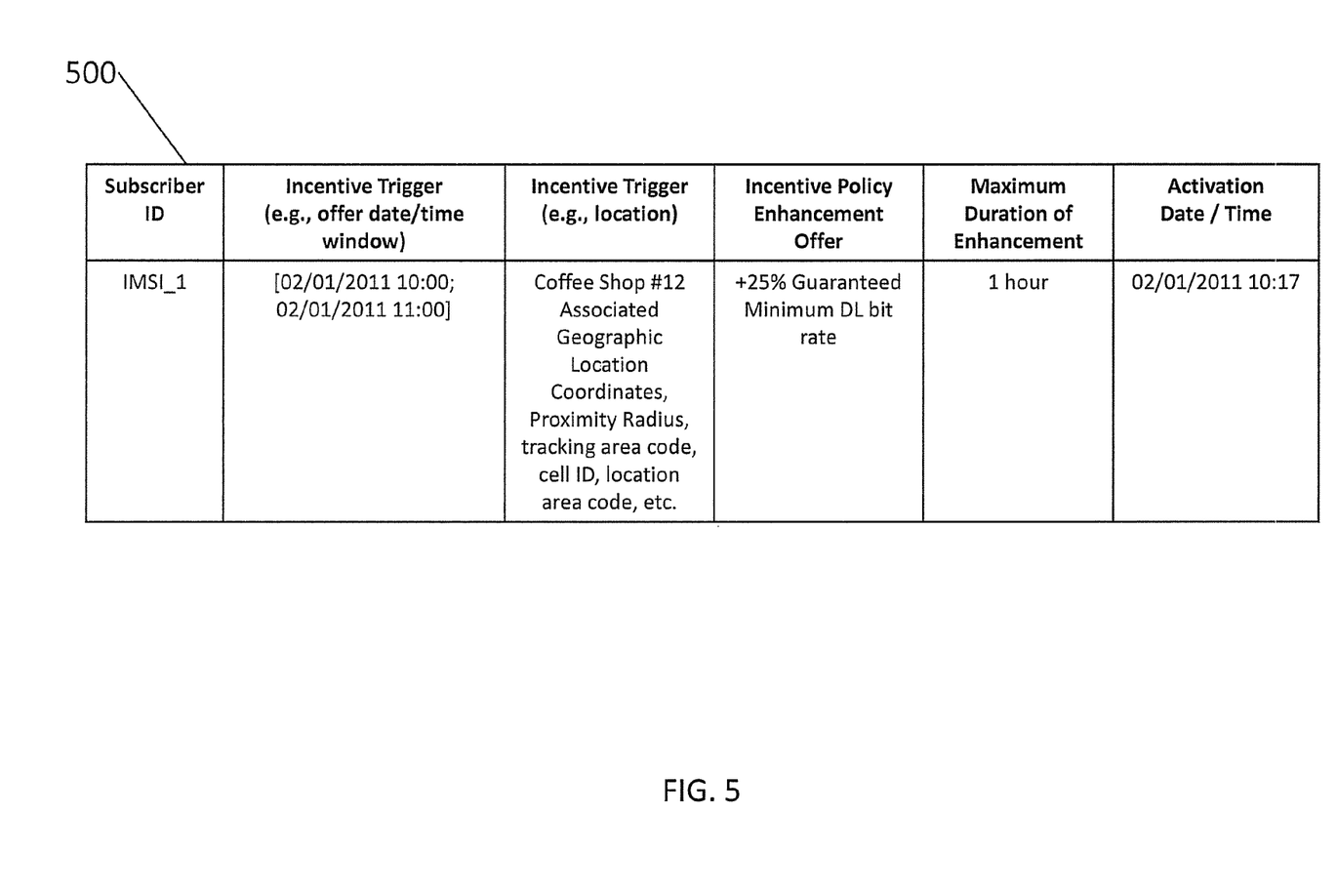
FIG. 5 illustrates an exemplary location-based policy enhancement and log data table for location-based policy enhancement according to an embodiment of the subject matter described herein.

FIG. 5 illustrates an exemplary location-based policy enhancement and log data table for location-based policy enhancement according to an embodiment of the subject matter described herein. Referring to FIG. 5, location-based policy enhancement and log data table 500 may include a variety of fields that may be used to specify one or more policy enhancement offer(s) and/or log events associated with the one or more policy enhancement offer(s). For example, table 500 includes a field for specifying a subscriber identifier which may be used to specify an identifier, such as an international mobile subscriber identity (IMSI), to which the location-based policy enhancement offer is to be communicated. Table 500 may also include a field for specifying a valid date and time range for the location-based policy enhancement offer (e.g., the location-based policy enhancement offer for a twenty-five percent increase in a user device's minimum guaranteed download bit rate may be valid on Feb. 1, 2011 from 10:00 am to 11:00 am). Table 500 may further include a field for specifying a location trigger for the location-based policy enhancement offer (e.g., location information, such as GPS coordinates and/or a proximity requirement, for the specified coffee shop). Table 500 may further include a field for specifying one or more policy attribute(s) for the location-based policy enhancement offer (e.g., a twenty-five percent increase in minimum guaranteed download bit rate). Table 500 may further include a field for specifying a maximum duration for the location-based policy enhancement offer (e.g., that the twenty-five percent increase in minimum guaranteed download bit rate is for one hour). Table 500 may further include a field for logging one or more activation date(s) and/or time(s) for the location-based policy enhancement offer (e.g., that the location-based policy enhancement offer was implemented for a user device associated with the subscriber on Feb. 1, 2011 at 10:17 am).

Figure 6A:
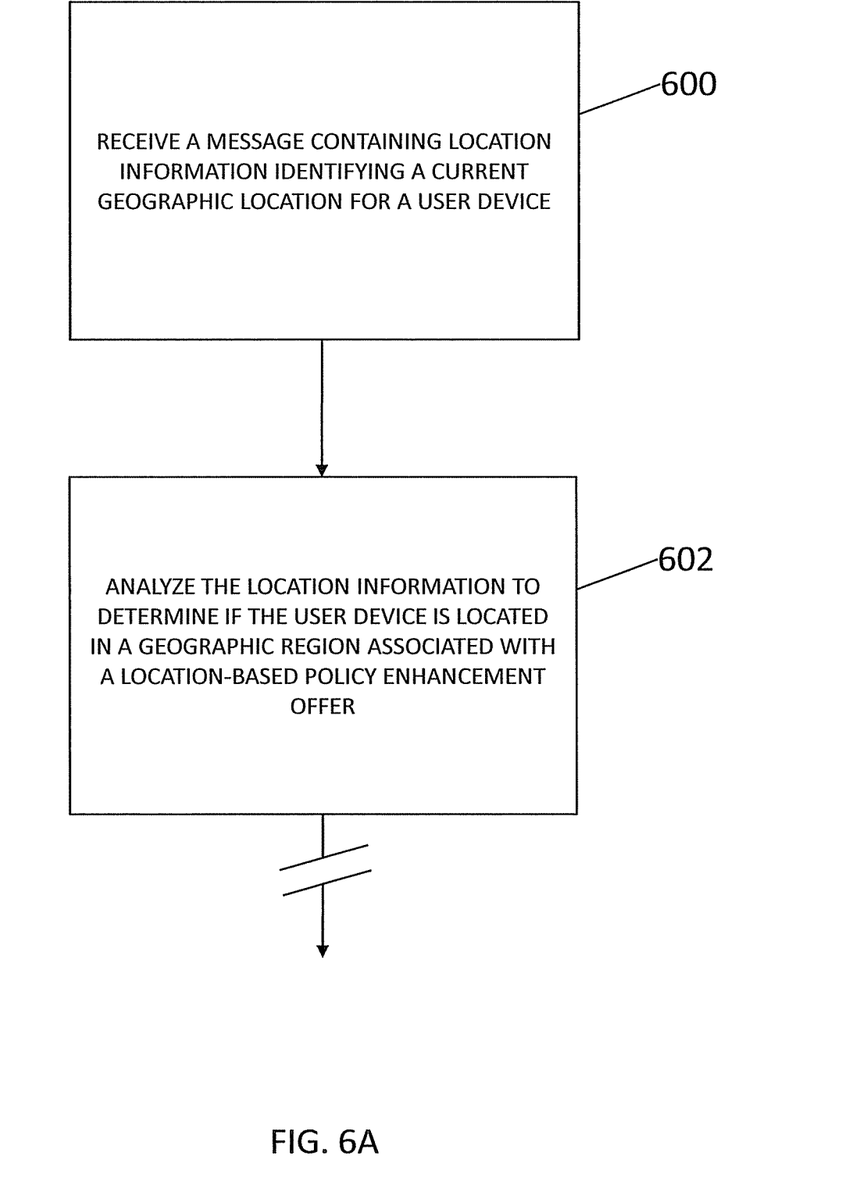
FIGS. 6A and 6B are respectively a first and second portion of a flow chart illustrating an exemplary process for location-based policy enhancement according to an embodiment of the subject matter described herein.
Figure 6B:
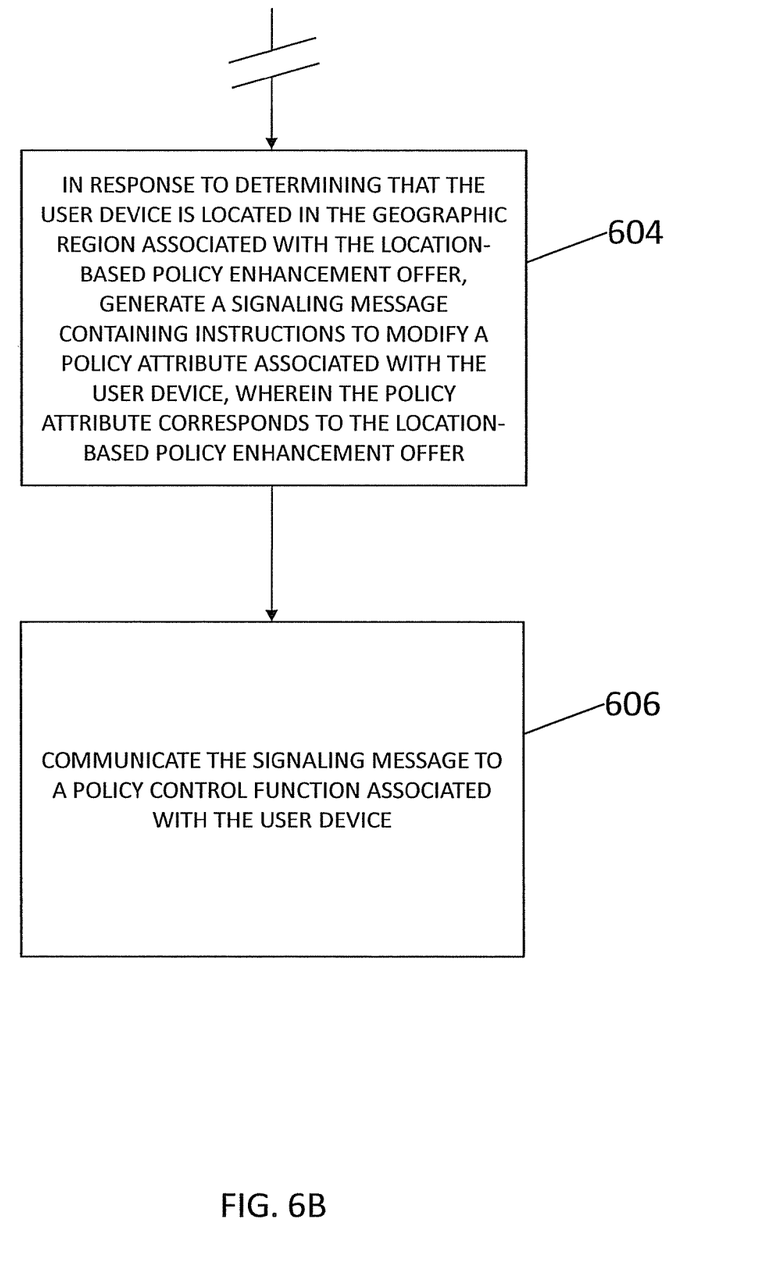

FIGS. 6A and 6B are respectively a first and second portion of a flow chart illustrating an exemplary process for location-based policy enhancement according to an embodiment of the subject matter described herein. Referring to FIG. 6A, in step 600, a message containing location information identifying a current geographic location for a user device is received. For example, AF node 116's policy enhancement module may receive a message from UE 102 containing location information identifying a current geographic location for UE 102 (e.g., GPS coordinates corresponding to the specified coffee shop). In step 602, the location information is analyzed to determine if the user device is located in a geographic region associated with a location-based policy enhancement offer. For example, AF node 116's policy enhancement module may analyze the location information identifying the current geographic location for UE 102 and determine that UE 102 is located in a geographic region (e.g., the specified coffee shop) associated with a location-based policy enhancement offer (e.g., the policy enhancement offer for a twenty-five percent increase in minimum download bit rate). Referring to FIG. 6B, in step 604, in response to determining that the user device is located in a geographic region associated with the location-based policy enhancement offer, a signaling message containing instructions to modify a policy attribute associated with the user device is generated, wherein the policy attribute corresponds to the location-based policy enhancement offer. For example, AF node 116's policy enhancement module may generate a signaling message for modifying the policy attribute (e.g., the minimum download bit rate) corresponding to the location-based policy enhancement offer (e.g., the offer for a twenty-five percent increase in the minimum download bit rate for a user device located at the specified coffee shop). In step 606, the signaling message is communicated to a policy control function associated with the user device. For example, AF node 116's policy enhancement module may communicate the signaling message to a policy control function associated with UE 102 (e.g., PCRF node 112).

Figure 7:
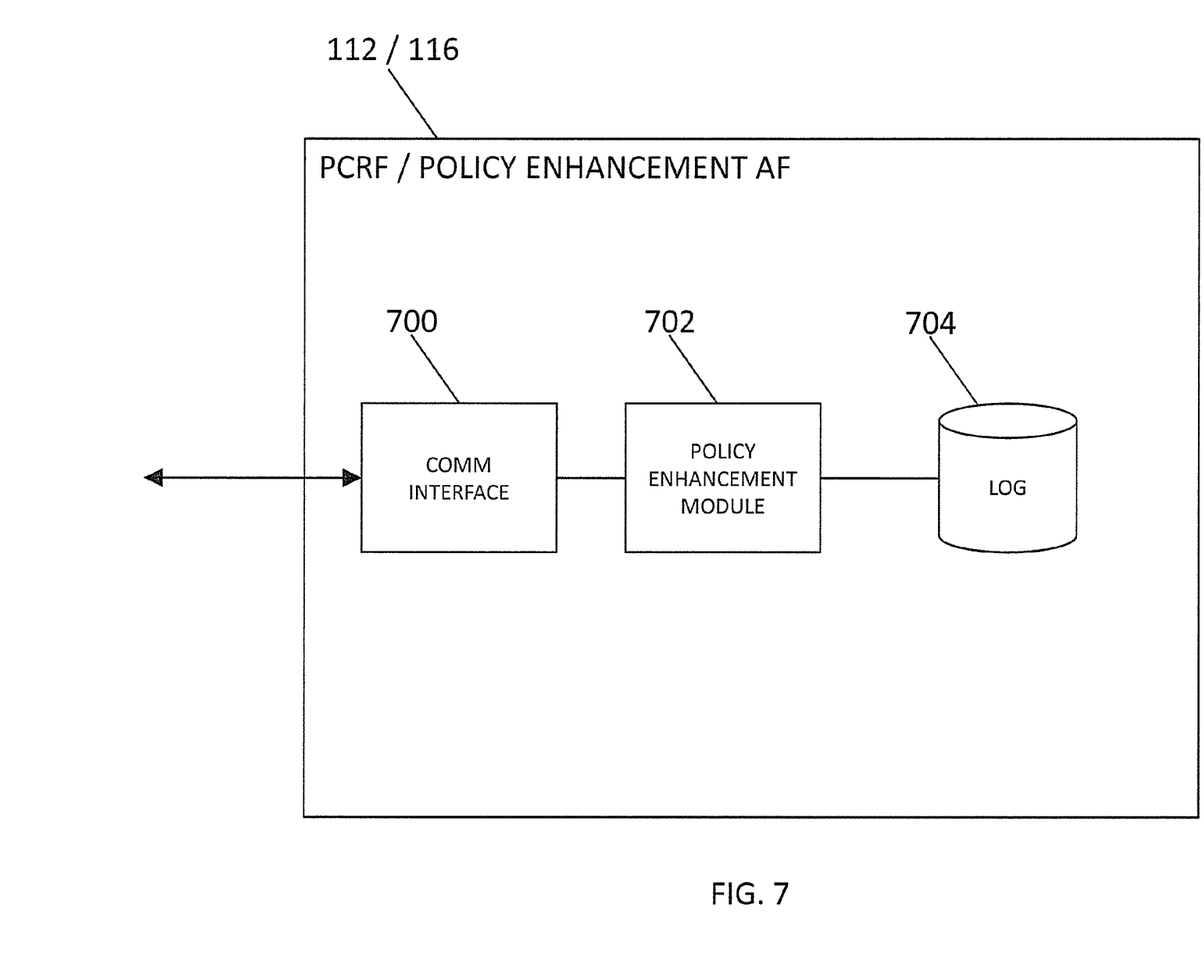
FIG. 7 is a block diagram of an exemplary location-based policy enhancement node according to an embodiment of the subject matter described herein.

FIG. 7 is a block diagram of an exemplary location-based policy enhancement node according to an embodiment of the subject matter described herein. Referring to FIG. 7, PCRF node 112 and/or policy enhancement AF node 116 may include communication interface 700 for sending and receiving messages. Communication interface 700 may be any interface capable of sending and/or receiving messages from other nodes, functions, and/or modules. Communication interface 700 may be configured to receive a message containing location information identifying a current geographic location for a user device. For example, communication interface 700 may be configured to receive a message from UE 102 containing location information identifying a current geographic location for UE 102 (e.g., GPS coordinates corresponding to the specified coffee shop). PCRF node 112 and/or policy enhancement AF node 116 may also include policy enhancement module 702. Policy enhancement module 702 may be configured to analyze the location information to determine if the user device is located in a geographic region associated with a location-based policy enhancement offer. For example, policy enhancement module 702 may be configured to analyze the location information identifying the current geographic location for UE 102 and determine that UE 102 is located in a geographic region (e.g., the specified coffee shop) associated with a location-based policy enhancement offer (e.g., the policy enhancement offer for a twenty-five percent increase in minimum download bit rate). Policy enhancement module 702 may also be configured to, in response to determining that the user device is located in the geographic region associated with the location-based policy enhancement offer, generate a signaling message containing instructions to modify a policy attribute associated with the user device, wherein the policy attribute corresponds to the location-based policy enhancement offer. For example, policy enhancement module 702 may be configured to generate a signaling message for modifying the policy attribute (e.g., the minimum download bit rate) corresponding to the location-based policy enhancement offer (e.g., the offer for a twenty-five percent increase in the minimum download bit rate for a user device located at the specified coffee shop). Policy enhancement module 702 may further be configured to communicate the signaling message to a policy control function associated with the user device. For example, policy enhancement module 702 may be configured to communicate the signaling message to a policy control function associated with UE 102 (e.g., PCRF node 112's policy control function). PCRF node 112 and/or policy enhancement AF node 116 may further include a non-transitory computer readable medium 704 for storing a location-based policy enhancement and/or log data table, such as location-based policy enhancement and log data table 500.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for location-based policy enhancement, the method comprising:
    receiving, from a user device, a message containing a policy enhancement code, wherein the policy enhancement code is associated with a location-based policy enhancement offer, wherein the policy enhancement code is obtained by utilizing a camera associated with the user device to derive the policy enhancement code from a bar code or a quick response (QR) code;
    receiving a message containing location information identifying a current geographic location for the user device, wherein the user device is a recipient of the location-based policy enhancement offer containing the policy enhancement code associated with the location-based policy enhancement offer;
    analyzing the location information to determine if the user device is located in a geographic region associated with the location-based policy enhancement offer, wherein the location-based policy enhancement offer offers an increased download bit rate associated with the user device if the current geographic location for the user device corresponds to the geographic region associated with the location-based policy enhancement offer;
    in response to determining that the user device is located in the geographic region associated with the location-based policy enhancement offer, generating a signaling message containing instructions to modify a policy attribute associated with the user device, wherein the policy attribute corresponds to the location-based policy enhancement offer; and
    communicating the signaling message to a policy control function associated with the user device.

2. The method of claim 1 comprising:
    receiving, by the policy control function associated with the user device, the signaling message;
    generating, by the policy control function associated with the user device, a policy control and charging (PCC) rule that modifies the policy attribute; and
    communicating, by the policy control function associated with the user device and to a policy enforcement function associated with the user device, the PCC rule.

3. The method of claim 1 comprising identifying the location-based policy enhancement offer based on the policy enhancement code.

4. The method of claim 1 wherein the policy enhancement code is obtained by utilizing a Bluetooth, radio frequency, or infrared module associated with the user device to obtain the policy enhancement code.

5. The method of claim 1 comprising communicating to the user device a policy enhancement offer message containing the policy enhancement code and a description of the geographic region associated with the location-based policy enhancement offer.

6. The method of claim 5 wherein the description of the geographic region associated with the location-based policy enhancement offer comprises at least one of a street address, a set of global positioning system (GPS) coordinates, and a set of map coordinates.

7. The method of claim 5 wherein the policy enhancement offer message comprises at least one of a short message service (SMS) message, a multimedia messaging service (MMS) message, an instant message, an email message, a social networking service message, a voicemail message, a Diameter message, an extensible markup language (XML) message, a session initiation protocol (SIP) message, and a simple object access protocol (SOAP) message.

8. The method of claim 2 wherein the PCC rule is configured to expire after a predetermined time period.

9. The method of claim 1 wherein the policy attribute specifies at least one of a guaranteed download bit rate, a minimum download bit rate, a maximum download bit rate, a permitted service data flow (SDF), a permitted QoS class, a permitted access point name (APN), a permitted destination Internet protocol (IP) address, and a download quota.

10. The method of claim 2 wherein the policy control function associated with the user device comprises a policy and charging rules function (PCRF) and wherein the policy enforcement function associated with the user device comprises a policy control and enforcement function (PCEF).

11. The method of claim 1 wherein the steps are performed at a network node that includes at least one of a policy and charging rules function (PCRF), a resource admission control subsystem (RACS), and an application function (AF).

12. The method of claim 1 wherein the message containing location information identifying the current geographic location for the user device comprises at least one of a street address, a set of global positioning system (GPS) coordinates, a set of map coordinates, geographical area description (GAD) shapes, and national marine electronics association (NMEA) sentences.

13. The method of claim 1 wherein the message containing location information identifying the current geographic location for the user device is received from at least one of the user device, a home subscriber server (HSS) associated with the user device, a location server associated with the user device, a home location register (HLR) associated with the user device, a mobility management entity (MME) associated with the user device, a bearer binding and event reporting function (BBERF) associated with the user device, a policy control and enforcement function (PCEF) associated with the user device, a call session control function (CSCF) associated with the user device, a presence server associated with the user device, a network monitoring system associated with the user device, a radio network controller (RNC) associated with the user device, a base transceiver station associated with the user device, a NodeB associated with the user device, and an eNodeB associated with the user device.

14. A system for location-based policy enhancement, the system comprising:
a communication interface configured to receive a message containing location information identifying a current geographic location for a user device, wherein the user device is a recipient of a location-based policy enhancement offer containing a policy enhancement code associated with the location-based policy enhancement offer; and
a policy enhancement module configured to:
analyze the location information to determine if the user device is located in a geographic region associated with the location-based policy enhancement offer, wherein the location-based policy enhancement offer offers an increased download bit rate associated with the user device if the current geographic location for the user device corresponds to the geographic region associated with the location-based policy enhancement offer;
in response to determining that the user device is located in the geographic region associated with the location-based policy enhancement offer, generate a signaling message containing instructions to modify a policy attribute associated with the user device, wherein the policy attribute corresponds to the location-based policy enhancement offer; and
communicate the signaling message to a policy control function associated with the user device,
wherein the policy enhancement module is configured to receive, from the user device, a message containing the policy enhancement code, wherein the policy enhancement code is associated with the location-based policy enhancement offer, wherein the policy enhancement code is obtained by utilizing a camera associated with the user device to derive the policy enhancement code from a bar code or a quick response (QR) code.

15. The system of claim 14 wherein the policy control function associated with the user device is configured to receive the signaling message, generate a policy control and charging (PCC) rule that modifies the policy attribute, and communicate the PCC rule to a policy enforcement function associated with the user device.

16. The system of claim 14 wherein the policy enhancement module is configured to identify the location-based policy enhancement offer based on the policy enhancement code.

17. The system of claim 14 wherein the policy enhancement code is obtained by utilizing a near field communication (NFC) module associated with the user device or a radio frequency identification (RFID) reader associated with the user device to obtain the policy enhancement code.

18. The system of claim 14 wherein the policy enhancement module is configured to communicate to the user device a policy enhancement offer message containing the policy enhancement code and a description of the geographic region associated with the location-based policy enhancement offer.

19. The system of claim 18 wherein the description of the geographic region associated with the location-based policy enhancement offer comprises at least one of a street address, a set of global positioning system (GPS) coordinates, and a set of map coordinates.

20. The system of claim 18 wherein the policy enhancement offer message comprises at least one of a short message service (SMS) message, a multimedia messaging service (MMS) message, an instant message, an email message, a social networking service message, a voicemail message, a Diameter message, an extensible markup language (XML) message, a session initiation protocol (SIP) message, and a simple object access protocol (SOAP) message.

21. The system of claim 15 wherein the PCC rule is configured to expire after a predetermined time period.

22. The system of claim 14 wherein the policy attribute specifies at least one of a guaranteed download bit rate, a minimum download bit rate, a maximum download bit rate, a permitted service data flow (SDF), a permitted QoS class, a permitted access point name (APN), a permitted destination Internet protocol (IP) address, and a download quota.

23. The system of claim 15 wherein the policy control function associated with the user device comprises a policy and charging rules function (PCRF) and wherein the policy enforcement function associated with the user device comprises a policy control and enforcement function (PCEF).

24. The system of claim 14 wherein the communication interface and the policy enhancement module are components of at least one of a policy and charging rules function (PCRF) node, a resource admission control subsystem (RACS) node, and an application function (AF) node.

25. The system of claim 14 wherein the message containing location information identifying the current geographic location for the user device comprises at least one of a street address, a set of global positioning system (GPS) coordinates, a set of map coordinates, geographical area description (GAD) shapes, and national marine electronics association (NMEA) sentences.

26. The system of claim 14 wherein the message containing location information identifying the current geographic location for the user device is received from at least one of the user device, a home subscriber server (HSS) associated with the user device, a location server associated with the user device, a home location register (HLR) associated with the user device, a mobility management entity (MME) associated with the user device, a bearer binding and event reporting function (BBERF) associated with the user device, a policy control and enforcement function (PCEF) associated with the user device, a call session control function (CSCF) associated with the user device, a presence server associated with the user device, a network monitoring system associated with the user device, a radio network controller (RNC) associated with the user device, a base transceiver station associated with the user device, a NodeB associated with the user device, and an eNodeB associated with the user device.

27. A non-transitory computer readable medium comprising computer executable instructions that when executed by a processor of a computer control the computer to perform steps comprising:

receiving, from a user device, a message containing a policy enhancement code, wherein the policy enhancement code is associated with a location-based policy enhancement offer, wherein the policy enhancement code is obtained by utilizing a camera associated with the user device to derive the policy enhancement code from a bar code or a quick response (QR) code;

receiving a message containing location information identifying a current geographic location for the user device, wherein the user device is a recipient of the location-based policy enhancement offer containing the policy enhancement code associated with the location-based policy enhancement offer;

analyzing the location information to determine if the user device is located in a geographic region associated with the location-based policy enhancement offer, wherein the location-based policy enhancement offer offers an increased download bit rate associated with the user device if the current geographic location for the user device corresponds to the geographic region associated with the location-based policy enhancement offer;

in response to determining that the user device is located in the geographic region associated with the location-based policy enhancement offer, generating a signaling message containing instructions to modify a policy attribute associated with the user device, wherein the policy attribute corresponds to the location-based policy enhancement offer; and communicating the signaling message to a policy control function associated with the user device.

* * * * *